United States Patent [19]
Aldokimov et al.

[11] Patent Number: 5,501,037
[45] Date of Patent: Mar. 26, 1996

[54] HYDROPONICS PROCESS AND DEVICE

[76] Inventors: Anatoly S. Aldokimov; Ivan A. Aldokimov; Vyacheslav A. Aldokimov, all of ulista Parkovaya, 95, kv. 209, Kramatorsk, Ukraine

[21] Appl. No.: 400,261

[22] Filed: Feb. 28, 1995

Related U.S. Application Data

[63] Continuation of Ser. No. 85,161, Jul. 2, 1993, abandoned.
[51] Int. Cl.$^6$ ............................ A01G 31/00; A01G 31/02
[52] U.S. Cl. ................................ 47/58; 47/27; 47/48.5; 47/59; 47/60
[58] Field of Search .................................... 47/58, 59, 60, 47/62, 79, 48.5, 27

[56] References Cited

U.S. PATENT DOCUMENTS 4,332,105  6/1982  Nir ................................................. 47/1

FOREIGN PATENT DOCUMENTS

| 6040807 | 12/1985 | Japan . |
| 917805 | 4/1982 | U.S.S.R. . |
| 1319793 | 6/1987 | U.S.S.R. . |

OTHER PUBLICATIONS

Kenyon, S. (1979) In: *Hydroponics for the Home Gardener,* p. 19 Van Nostrand Reinhold Ltd, N.Y.

Primary Examiner—David T. Fox
Assistant Examiner—Elizabeth F. McElwain
Attorney, Agent, or Firm—Lilling & Lilling

[57] ABSTRACT

The object of the invention is to provide a process and a device for hydroponic raising of plants in a vegetal vessel filled up with a substrate, by conveying a nutrient solution into the roots feeding zone, wherein the supply of the nutrient solution is carried out by way of aerosol irrigation of the substrate surface at time intervals and with the periodicity and duration of irrigation depending on ambient air temperature. The device for the implementation of the process comprises a collector of the nutrient solution, a pump, a vegetal vessel with a drain connection, the upper portion of which accommodates a distributor of the nutrient solution made in the form of a tube which lower part is perforated, the said tube being placed at a distance above the substrate surface, the total area of the openings in the distributor tube is smaller than the cross-sectional area of the drain connection.

4 Claims, 1 Drawing Sheet

5,501,037

HYDROPONICS PROCESS AND DEVICE

This is a continuation of application Ser. No. 08/085,161 filed on Jul. 2, 1993, now abandoned.

FIELD OF THE INVENTION

The invention relates to a process of hydroponics in the residential and public quarters, and also it relates to a device to implement the said process.

BACKGROUND OF THE INVENTION

There is the known process for aeroponic raising of plants (SU, A, 1319793) which includes their arrangement or placement and fixation in the vegetal vessels made in the form of horizontally located tubes having openings in their walls to enable the plants arrangement. Conveyed by the tubes at a definite time interval is a nutrient solution, which is subsequently discharged, with the exposure of plants in the absence of the solution.

The prior art process has substantial disadvantages which consist, specifically, in that the use of tubes as vegetal vessels creates inconvenience in the employment of the device in the day-to-day conditions of life. Apart from that, the tubes prohibit monitoring of the plants growth, and this may result in their sickness and loss. Especially, this is caused by the fact that when the tubes are filled up with the nutrient solution, there inevitably arises hydrogen starvation of the plants affecting their development, and virtually, their yield or crop capacity.

There is also the known process and the known device for hydroponics (JP, B, 60-40807) which includes a vegetal vessel with a nutrient solution, and an apparatus designed to saturate the nutrient medium contained in the vegetal vessel with oxygen. Despite the fact that the said apparatus provides improvement of oxygen supply to the root system, it does not eliminate the disadvantage connected with the possibility of decaying the root system which is continuously immersed in the solution.

Known as well is the device for hydroponics (SU, A, 917805) which contains a collector to receive a nutrient solution, a pump, a vegetal vessel with a drain connection, in the upper part of which there is placed a distributor of the nutrient solution, the said distributor being manufactured in the form of a perforated tube, and the said pump is connected, on the one side, with the distributor of the nutrient solution, and, on the other side, it is connected with the collector of the nutrient solution.

The disadvantage of the above device consists in nonuniformity of watering of the substrate due to the fact that in the absence of forced conveyance of the solution, watering extends only lengthwise/along the protracted sides of the vessel. Another reason of nonuniformity lies in the possibility of bridging the openings in the tube because the employed method of the nutrient mixture supply to the substrate allows no clearance. Apart from that, in the course of irrigation by gravity, a substantial portion of the nutrient matter settles out in the form of sediment in the nutrient solution conveyance system.

SUMMARY OF THE INVENTION

The object of the invention consists in the elimination of the above disadvantages, specifically, it consists in the improvement of the growth of plants and their higher crop capacity along with the simplification of the device design.

The object is achieved by supplying the nutrient solution by way of aerosol irrigation of the substrate surface with periodicity and duration of irrigation depending on ambient air temperature. In case ambient air temperature is within the range of 18 to 22 degrees C., then, irrigation is carried out for 50 to 70 seconds at intervals of 10 to 14 minutes. When ambient air temperature reaches 23 to 29 degrees C., irrigation is carried out for 30 to 50 seconds at intervals of 6 to 10 minutes; above 29 degrees C.—for 10 to 30 seconds at intervals of 2 to 6 minutes.

The proposed process of hydroponics is obtained with the help of a device, in which the perforated tube located in the upper part of the vegetal vessel, is placed at a distance above the substrate surface, the sum total area of openings made in the tube being smaller than the cross-section area of the drain connection.

To increase the efficiency of spraying the nutrient solution which is supplied by the tube and discharged in the form of jets through the tube openings onto the substrate surface, it is suggested that the openings in the lower part of the tube should be kept alternately directed at an angle of 45 degrees in relation to one and another side of the vertical plane which passes along through the center of the tube.

DETAILED DESCRIPTION OF THE PREFERRED EMBODIMENT

The invention will now be described in greater detail with reference to the drawings showing the device for hydroponics of the invention, wherein

Figure 1:
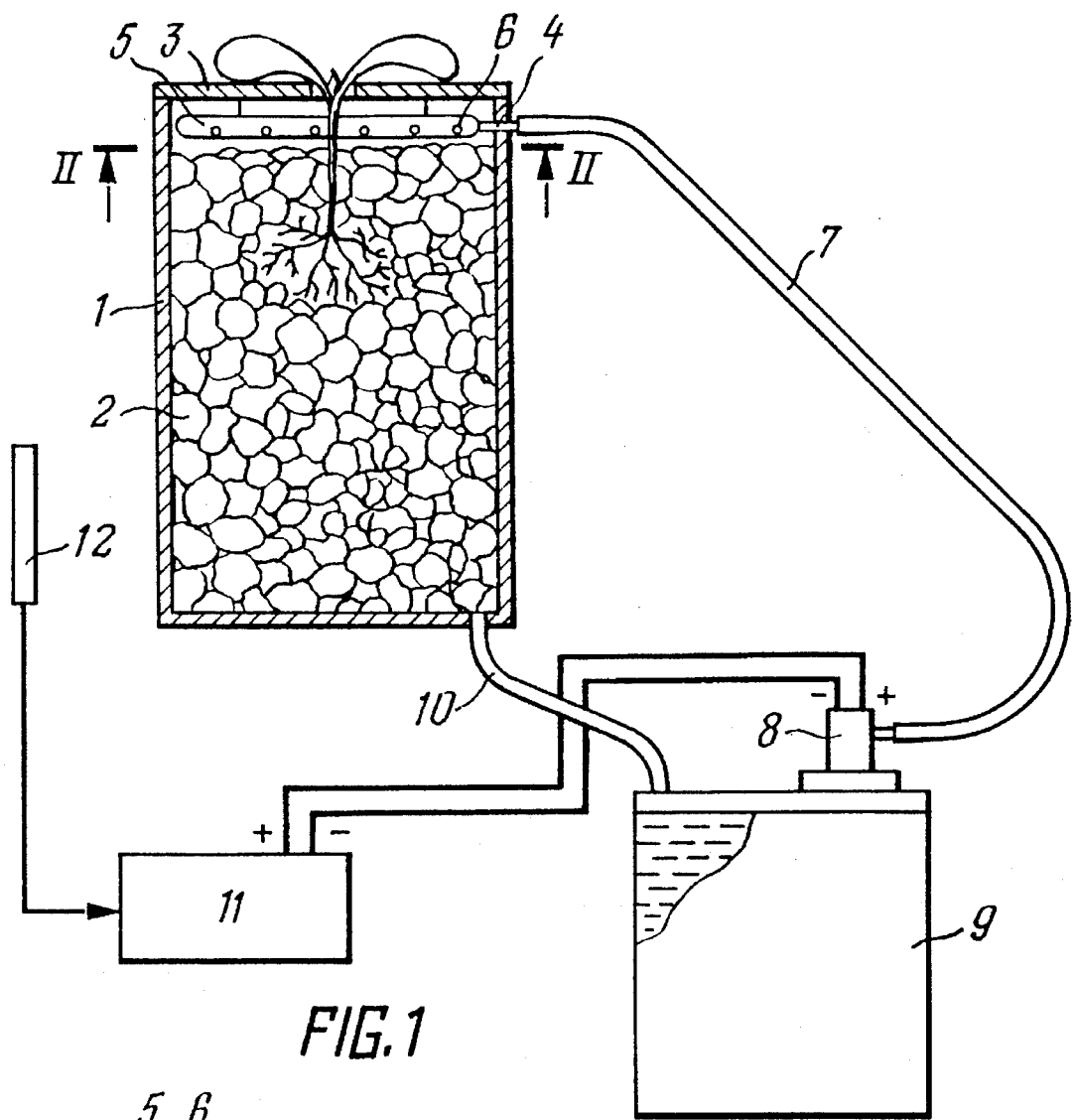
FIG. 1 illustrates the device according to the invention (partial section)
Figure 2:
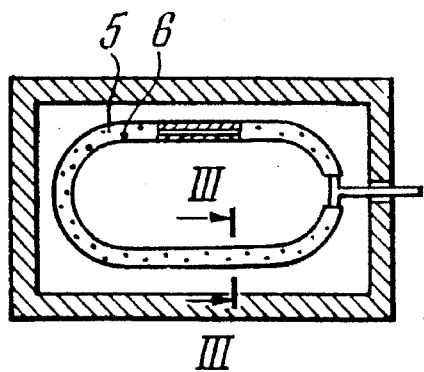
FIG. 2 is a view taken along line II—II in FIG. 1.
Figure 3:
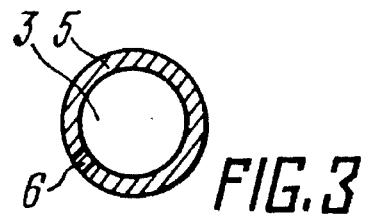
FIG. 3 is a cross-section of the tube along line III—III in FIG. 2.

The device for raising plants has a vegetal vessel 1, in which the plant is arranged and fixed inside with the help of a substrate 2. On top of the vessel, there is a cover, passing through which is the above-ground portion of the plant. In the upper part of the vessel 1 wall there is an opening for the tube 4 by which the nutrient solution is transported to the distributor 5 placed at a certain distance from the substrate surface. Rigidly connected to the cover 3, is the distributor 5 represented by a polyvinyl tube, in the lower side of which there are the openings 6. The openings 6 are placed at an angle of 45 degrees in relation to the plane passing centrally along the tube and are directed alternately to one and another side of the same. The tube 4 is joined by the flexible tube (hose) 7 to the pump 8, which conveys the nutrient solution from the collector 9, while in the bottom (floor) of the vegetal vessel 1 there is a drain outlet to accommodate the drain connection 10 communicating with the collector 9 of the nutrient solution. The pump 8 is connected to the program control facility 11.

Inside the vegetal vessel 1 and at the window where the device is installed, there are placed the thermocouples 12 joined to the program control facility 11.

Raising of plants in the proposed device is carried out as follows.

In the vegetal vessel 1, seedling is placed and fixed with the help of the substrate 2, with which the whole vessel is filled up. For example, keramzite can be used as a substrate. The above-ground portion of the plant passes through the cover 3, by which the vessel 1 is shut. Attached to the cover is the distributor 5 of the nutrient solution, the said distributor being placed, after the cover is made fast to it, at a certain distance above the substrate 2 surface. The distance between the cover 3 and the substrate 2 surface is selected such that the jets of the nutrient solution which are disbarred from the openings existing in the lower side of the distributor 5 tube, strike loss-free against the substrate 2 surface, thus creating, at the moment of the strike, a fine-dispersed medium of the nutrient solution which humidifies not only the surface layer, but also permeates through its whole depth, thus sustaining the moisture content of the substrate 2. The resulting surplus nutrient solution is emptied through the drain connection 10 back into the collector 9. Since the sum total section area of all openings, by which the nutrient solution is transported to the vessel, is smaller than the cross-section of the drain connection 10, it is ensured that the vegetal vessel is not filled up with the solution, but only the substrate is humidified, which positively helps the development of the plants.

The program control facility 11 operates in the cyclic mode according to one of the three programs running automatically, depending on climate conditions and ambient temperature. The command to change the mode of maintaining the vessel and the substrate humidification is generated by the thermocouple 12 which is connected to the program control facility 11.

Once the device is switched on, the program control facility 11 will run one of the programs depending on ambient temperature, and the pump 8 will start supplying the nutrient solution through the distributor 5. For example, at 20 degrees C. the pump 8 will supply the nutrient solution for 60 seconds, after which operation the pump will remain idle for 12 minutes. The surplus nutrient solution will be returned to the collector through the drain connection 10, while the root system will get nutrition in the form of aerosol feeding medium. Then the cycle is repeated. In case ambient temperature changes, the devices will start operating in different mode.

A ambient temperature increases, evaporation through the leaves increases. Hence, the necessity to provide additional and more frequent irrigation of the substrate with the nutrient solution, at such intervals that are required to improve absorption of air-and-solution feed by the root system.

Raising of vegetables in the proposed process excludes flooding of the root system by the solution because the section of the drain connection is larger than the sum total area of the openings in the perforated tube of the distributor. The employment of this device according to the invention allows coincidence of feeding the root system both with the nutrient solution and air oxygen which is good for the growth of plants and their crop capacity.

The employment of the said invention gives way to 20 to 30 percent increase of the crop capacity, compared to the known processes and devices for hydroponics. It also decreases the frequency of sickness and loss of plants.

In addition, the above device is much more simple in design, and for that reason it is less expensive. The front panel being transparent and with a decorative curtain to keep out light influence, it is possible to watch the growth of the root system as well as the supplies of the nutrient solution, and to intervene any time in case of unexpected developments.

INDUSTRIAL APPLICABILITY

The proposed process and the device for its implementation are designed for growing vegetables in the hot houses as well as in residential quarters. Their operation and maintenance can be performed by a single family.

We claim:

1. A process for hydroponic raising of plants in an enclosed vegetal vessel, comprising:

filling the said enclosed vegetal vessel with a substrate;

arrangement of seedling in said substrate within said enclosed vegetal vessel;

pressurized aerosol irrigation of the substrate surface with a nutrient solution from above said substrate surface; and changing periodicity of said irrigation inversely with respect to ambient air temperature;

changing duration of said irrigation inversely with respect to ambient air temperature; and wherein periodicity and duration of said irrigation are changed proportionately with respect to one an other.

2. A process of claim 1, wherein the said irrigation of the said substrate surface is carried out for 50 to 70 seconds at intervals of 10 to 14 minutes at ambient air temperature of 18 to 22 degrees C.

3. A process of claim 1, wherein the said irrigation of the said substrate surface is carried out for 30 to 50 seconds at intervals of 6 to 10 minutes at ambient air temperature of 23 to 29 degrees C.

4. A process of claim 1, wherein the said irrigation of the said substrate surface is carried out for 10 to 30 seconds at intervals of 2 to 6 minutes at ambient air temperature above 29 degrees C.

* * * * *